July 9, 1957     A. BENNETT     2,798,390
KNURLING TOOLS FOR EXTERNAL CYLINDRICAL SURFACES
Filed July 27, 1953
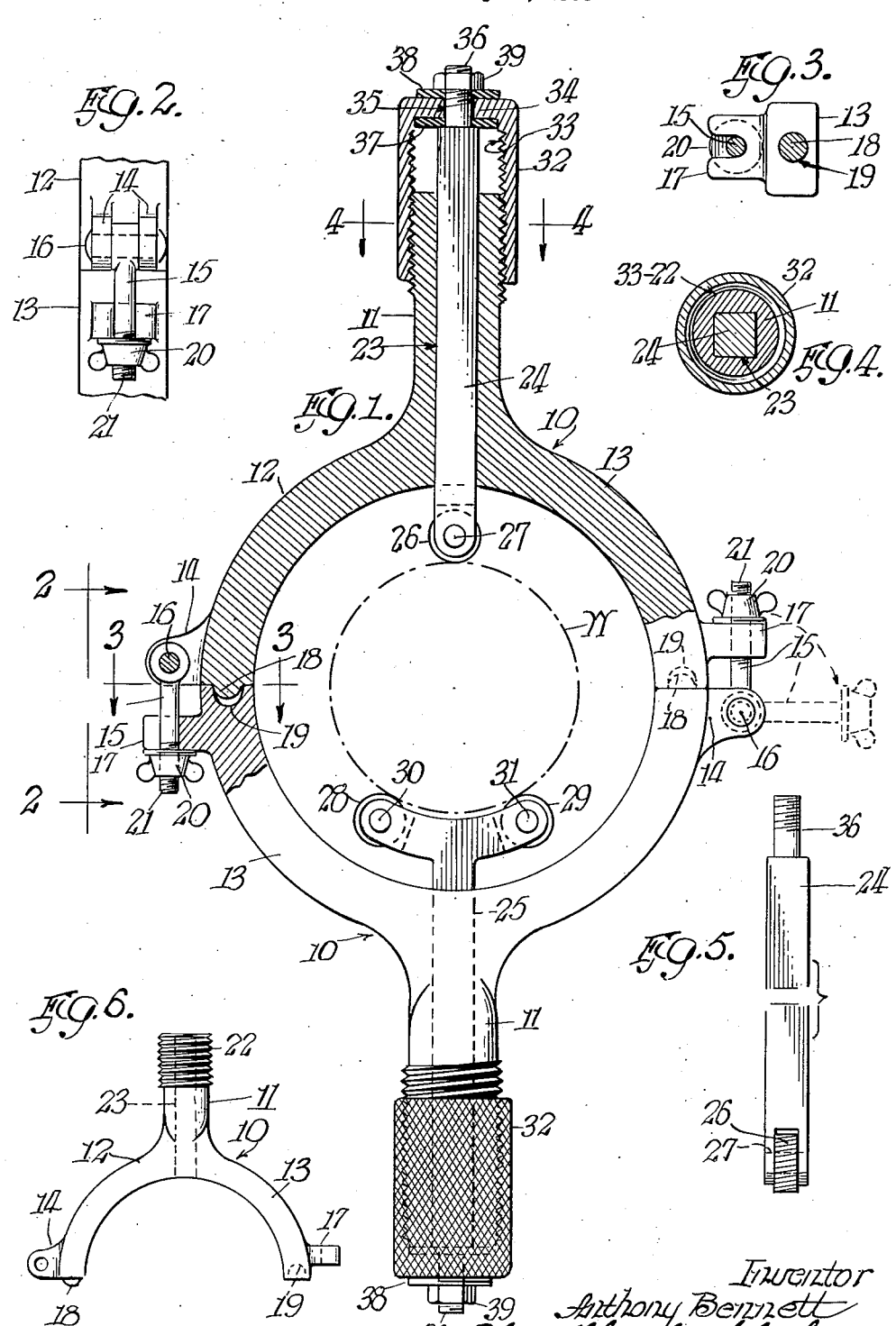

United States Patent Office 2,798,390
Patented July 9, 1957

2,798,390

KNURLING TOOLS FOR EXTERNAL CYLINDRICAL SURFACES

Anthony Bennett, Niles, Ill., assignor to Porto Knurling Tools, Inc., Chicago, Ill., a corporation of Illinois Application July 27, 1953, Serial No. 370,275

2 Claims. (Cl. 80—5.1)

The invention relates to improvements in knurling tools and it consists in the matters hereinafter illustrated and described and more particularly pointed out in the appended claims.

The invention is more particularly concerned with tools for knurling the external surface of worn cylindrical work pieces, to "raise" the metal of said surface and provide a better fit for parts with which the worn cylindrical member is intended to coact.

One of the objects of the invention is to provide a tool of this type which shall be of simple, strong and rigid construction well adapted to raise the external surface of cylindrical work pieces, which vary greatly in diameter.

Another object of the invention is to provide a tool for the purpose mentioned, which tool shall be so constructed that it may be placed in encircling relationship around a cylindrical work piece in such manner that the knurling devices may be radially adjusted and the tool as a whole rotated relatively to the work piece.

Again, it is an object of the invention to provide a knurling tool of the type mentioned wherein two frame members of like construction may be associated together as a pair to comprise a tool adapted for rotation as a whole around the work piece whereby the cost of production is reduced.

A still further object of the invention is to provide a knurling tool of the kind described wherein a pair of like frame members may be secured together to form a circular frame structure whereby very light sections may be employed and yet provide adequate strength for the purposes for which the tool is designed.

Another object of the invention is to provide a tool for knurling the external surface of a cylindrical work piece which shall embody stem-like means which cooperate in the manual operation of moving the knurling elements inwardly and outwardly and which also serve as handles whereby the tool as a whole may be turned around the work piece on which the tool is to operate.

The above mentioned objects of the invention, as well as others, together with the advantages thereof, will more fully appear as the specification proceeds.

In the drawings:

Fig. 1 is a face view, partly in plan and partly in section, illustrating the tool with the parts in the position which they occupy when the knurling wheels act upon the external surface of the work piece.

Fig. 2 is a fragmentary view along the line 2—2 of Fig. 1.

Fig. 3 is a detail sectional view on the line 3—3 of Fig. 1.

Fig. 4 is a cross sectional view on the line 4—4 of Fig. 1.

Fig. 5 is a view in plan of one of the knurl carrying members, and

Fig. 6 is a face view of one of the spanner-like frame members which, when associated with a like member, comprise the frame structure of the tool.

In general the tool comprises a pair of like members which are secured together for rotation around a work piece. Each member is of like construction so that when rotated relatively through 180° two like members may be associated together to comprise a frame structure of generally circular shape. Means are provided for detachably securing these frame members together, each frame member slidably accommodating means carrying knurling wheels for acting on the external surface of the work piece to be treated.

Referring now to the specific device illustrated in the drawings, each frame member is of the construction shown in Fig. 6. Since two of such members are associated together, a description of one frame member will suffice for both. The frame 10 comprises a central stem portion 11 and two arm portions 12 and 13 of arcuate construction. The two arm pieces 12 and 13 together constitute a semicylindrical frame.

The arm 12 includes a pair of lugs 14 in which a bolt 15 is swingably secured, by means of a pivot pin 16. The other arm 13 carries a slotted projecting lug 17 which, as best shown in Figs. 1, 2 and 3, is adapted to receive an end portion of the bolt 15 of the other frame member.

The arm 12 also contains a button-like projection 18, while the arm 13 contains a similarly formed recess 19. When two frame members are associated together and one is turned through 180° relative to the other, the button 18 of one frame enters the adjacent recess 19 of the other frame. When the frames are thus associated they may be tightly drawn and held together by means of the wing nuts 20 which have threaded engagement with the threaded end 21 of the bolts 15, the coacting buttons and recesses 18 and 19 respectively serving to hold the two frame members 10 in operative alignment.

The stem 11 is enlarged and externally threaded at the outer end, as indicated at 22. The stem is also provided with a central bore 23 of polygonal shape, in the specific instance illustrated being of square formation.

Mounted in the bores 23 are stem-like members 24 and 25 respectively, each having a cross sectional shape corresponding to the shape of the bore 23 in the stem 11. The inner end of member 24 carries a single knurling wheel 26 rotatably mounted on a pivot 27 which is parallel to the axis on which the tool as a whole is to be rotated.

The inner end of member 25 carries a pair of knurling wheels 28 and 29 mounted on pivot pins 30 and 31, which are parallel to the pivot pin 27.

Since the mechanism for moving the members 24 and 25 is the same, a description of one will serve for both. Surrounding the outer end of the stem 11 is a sleeve 32, internally threaded at 33 to coact with threads 22 on the outer end of the stem 11. The sleeve 32 has an end wall portion 34 provided with a central opening 35 through which the reduced threaded end portion 36 of the member 24 (or 25, as the case may be) projects.

Washers 37 and 38 are provided on the reduced portion 36, being disposed upon opposite sides of the wall 34 of the sleeve 32. A nut 39 secures the member 24 (or 25, as the case may be) to the wall 34 of the sleeve 32 so that as the sleeve 32 is screwed inwardly or outwardly of the stem 11, the knurl carrying member is caused to move therewith. The arrangement is such as to permit rotation of the sleeves 32 relative to the members 24 and 25, since the latter cannot rotate in the stems 11 due to the polygonal shape of the members and the bores of the stems in which the same have sliding but nonrotatable movement.

The operation of the device

It is believed that the foregoing detailed description of the tool will make clear the intended mode of operation. If the work piece to be operated upon so permits, the tool may be assembled as shown in Fig. 1, but with the knurling wheels retracted to permit the tool to be slipped over the end of the work piece, after which the sleeves 32 may be actuated to bring the knurling wheels into forceful contact with the external surface of the work piece W.

Should the work piece W be of such shape that the tool cannot be slipped over the end, the two frame members 10 may be separated and then swung into position around the work piece W, thereafter being secured in operative association by means of the clamping bolts 15.

Because the two frame members 10, when clamped together, as indicated in Fig. 1, form a complete circular frame, an extremely strong structure is formed, thus making possible the use of the very light frame sections which reduce the cost and facilitate handling of the tool.

The arrangement is also advantageous in that the stem portions not only coact in providing means for moving the knurling wheel carrying members inwardly and outwardly, but they also serve as convenient handles for turning the tool as a whole relative to the work piece, the external surface of which is to be acted upon.

It is believed that the various advantages of the described structure will be understood without further comment.

I claim:

1. A tool for knurling the external surface of a work piece including a frame piece comprising a pair of connected arcuate arms arranged to define a semi-circular yoke, a handle extending away from the yoke at the juncture of said arms, a radially outwardly projecting lug at the free end of each arm, one of said lugs having a slot opening outwardly, a bolt pivotally carried by the other lug, said handle having a polygonal bore therein lying in a radius of said yoke, a polygonal bar slidably received in each bore and normally projecting from said handle and said semi-circular yoke, a knurling element carried on the end of said bar projecting from said yoke, means on said handle for translating said bar, and a second frame piece identical to said first frame piece but rotated 180° therefrom, whereby the free ends of the yokes abut each other to define a substantially circular framework, and the bolts on said frame pieces detachably connecting the frame pieces together, whereby dismantling of the tool from a shaft may be accomplished by loosening the bolt on either side thereby permitting better versatility of the tool.

2. A tool for knurling the external surface of a work piece including a frame piece comprising a pair of connected arcuate arms arranged to define a semi-circular yoke, a handle extending away from the yoke at the juncture of said arms, a radially outwardly projecting lug at the free end of each arm, one of said lugs having a slot opening outwardly, a bolt pivotally carried by the other lug, said handle having a polygonal bore therein lying in a radius of said yoke, a polygonal bar slidably received in each bore and normally projecting from said handle and said semi-circular yoke, a knurling element carried on the end of said bar projecting from said yoke, means on said handle for translating said bar, said means comprising a tubular member which is threaded to mate a threaded portion on the outer end of each handle and means to connect the tubular member to the outer ends of said polygonal bar, said threading of said tubular members and said threaded portion being of such a hand that opposite rotation of said tubular members effects translation of said bore and knurling elements selectively toward and away from said work piece, and a second frame piece identical to said first frame piece but rotated 180° therefrom, whereby the free ends of the yokes abut each other to define a substantially circular framework, and the bolts on said frame pieces detachably connecting the frame pieces together, whereby dismantling of the tool from a shaft may be accomplished by loosening the bolt on either side thereby permitting better versatility of the tool.

References Cited in the file of this patent

UNITED STATES PATENTS

| Number | Name | Date |
| --- | --- | --- |
| 441,603 | Tideman | Nov. 25, 1890 |
| 547,615 | Donohue | Oct. 8, 1895 |
| 980,197 | Campbell | Jan. 3, 1911 |
| 1,017,403 | Garbarino et al. | Feb. 13, 1912 |
| 1,407,058 | Fullmer | Feb. 21, 1922 |
| 1,983,922 | Ruppel | Dec. 11, 1934 |